Nov. 14, 1972  F. E. SHAFFER  3,702,709

CABLE CONNECTOR

Filed May 20, 1971

INVENTOR.
FRANK E. SHAFFER
BY Fulwider, Patton, Rieber
Lee and Utecht
ATTORNEYS

United States Patent Office 3,702,709
Patented Nov. 14, 1972

3,702,709
CABLE CONNECTOR
Frank E. Shaffer, P.O. Box 1546,
Costa Mesa, Calif. 92626
Filed May 20, 1971, Ser. No. 145,196
Int. Cl. F16g 11/00
U.S. Cl. 287—81     6 Claims

ABSTRACT OF THE DISCLOSURE

A cable connector including an elongated fitting carrying a mounting pin which has an enlarged bushing formed with a peripheral load-bearing groove mounted thereon. A generally C-shaped thimble is formed with an enlarged central bite portion which is larger in interior cross section than the longitudinal cross section of the groove for receipt in such groove. Further, the thimble is formed at its opposite extremities with a pair of inwardly angled legs, such thimble being formed exteriorly with a peripheral cable-receiving trough whereby the bushing may be mounted on the mounting pin and thimble fitted thereover and the cable fed through the trough and looped around such thimble and secured so that when forces are applied to the cable, the bushing and thimble will cooperate to maintain the looped portion formed with a relatively larger cable to prevent sharp bends therein and the trough will provide support against flattening of the cable which enables the thimble to articulate relative to the bushing.

BACKGROUND OF THE INVENTION

Field of the invention

The present invention relates to cable connectors which incorporate bushings to prevent unduly sharp curvatures being formed in the cable when high forces are applied thereto.

Description of the prior art

Numerous cable connectors have been proposed which incorporate bushings over which the cable is looped but such connectors suffer the shortcomings that when high forces are applied to the cable, the cable will flatten out on the bushing thereby causing deterioration thereof. Further, many prior art connectors fail to provide for articulation of a cable-receiving thimble with respect to a bushing.

SUMMARY OF THE INVENTION

The cable connector of the present invention is characterized by a bushing having a generally C-shaped thimble fitted thereover and formed exteriorly with a trough for receipt of the cable and loosely fitting such bushing to allow for articulation therebetween.

The objects and advantages of the present invention will become apparent from a consideration of the following detailed description when taken in conjunction with the accompanying drawing.

DESCRIPTION OF THE PREFERRED EMBODIMENT

Figure 1:
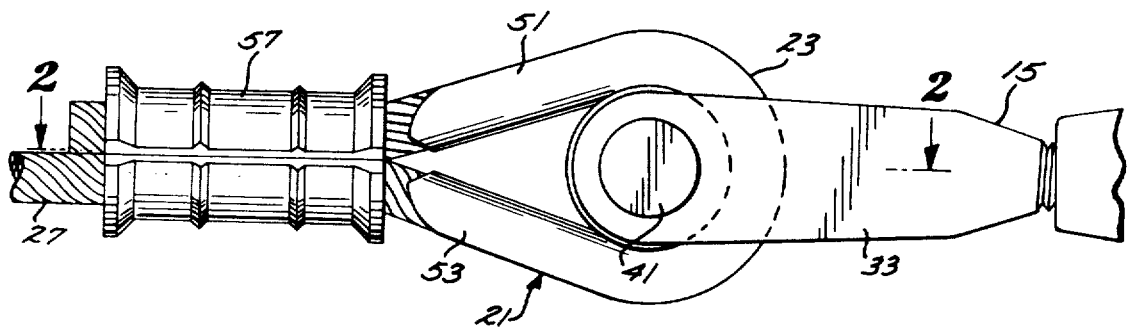
FIG. 1 is a side view of a cable connector embodying the present invention.
Figure 2:
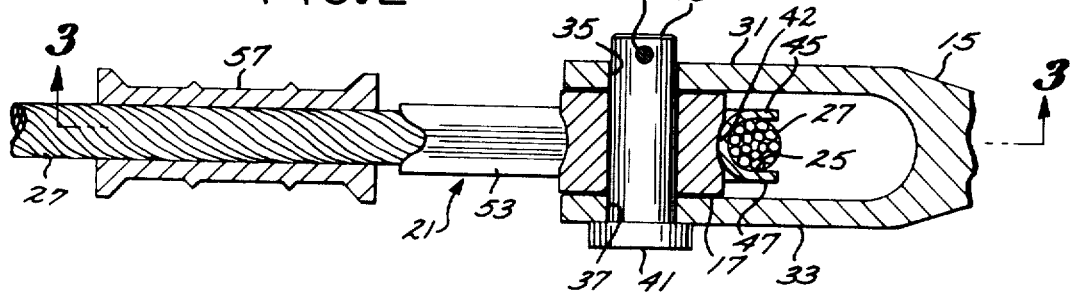
FIG. 2 is a longitudinal view taken along the line 2—2 of FIG. 1.

The cable connector of the present invention includes a mounting pin 13 which is carried from a bifurcated fitting 15 and, itself, mounts a pulley-shaped bushing 17. Carried on the pulley 17 is a generally C-shaped lining thimble, generally designated 21, such thimble being formed with an enlarged circular central portion 23 for receipt over the bushing 17 and being formed exteriorly with a peripheral outwardly opening trough 25 (FIG. 2) for receipt of a cable 27 looped over such thimble. Consequently, when high forces are applied to the cable 27, the thimble 21 will provide support against flattening of such cable and will provide for articulation between such thimble and bushing.

The connector of the present invention may conveniently be utilized for boat rigging and the fitting 15 shown in the preferred embodiment includes a pair of parallel tines 31 and 33 which have respective transverse bores 35 and 37 formed in the projecting extremities thereof for receipt of the mounting pin 13.

The mounting pin 13 is formed on one end with an enlarged-in-diameter head 41 and includes a transverse bore in its opposite end for receipt of a cotter key 43.

The bushing 17 is formed with a circular peripheral groove 42 having retaining ribs 44 and 46 formed on the opposite sides thereof to maintain the thimble 21 centered on such bushing.

The thimble 21 is conveniently made from a strip of slightly resilient sheet metal that is turned up on its opposite edges to form a pair of co-extensive side walls 45 and 47 (FIG. 2) which are spaced apart a distance equal to the diameter of the cable 27 to thereby provide support against flattening of such cable. It is noted that the side walls 45 and 47 project radially outwardly beyond the diameter of the cable 27 to thereby provide support for more than half the diameter of such cable. The thimble 21 has its opposite extremities bent back to form the central enlarged bite portion 23 with a slightly larger diameter than the diameter of the bushing groove 42 to thereby provide for a slight amount of articulation between the thimble 21 and the bushing 17. The opposite extremities of the thimble 21 are then bent inwardly to form inwardly angled legs 51 and 53 which are brought nearly together at their ends.

Figure 3:
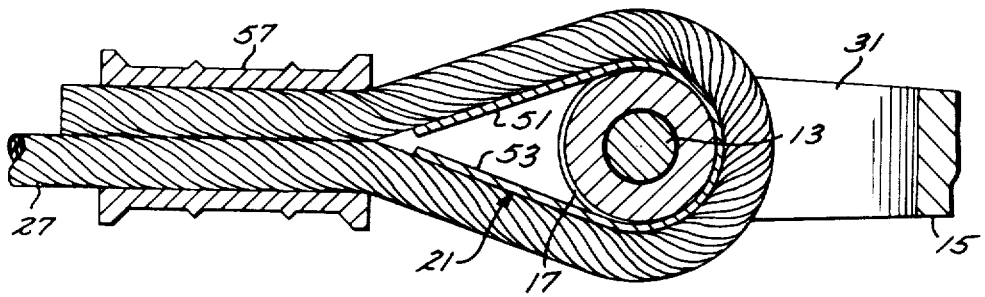
FIG. 3 is a longitudinal sectional view taken along the line 3—3 of FIG. 2.

In operation, the bushing 17 may conveniently be snapped onto the thimble 21, the slight resiliency of such thimble enabling the legs 51 and 53 to spread slightly for receipt of such thimble in the groove 42. The assembled thimble 21 and bushing 17 may then be mounted on the fitting 15 by positioning such assembly between the tines 31 and 33 and inserting the mounting pin 13. The cable 27 may then be fed through the thimble trough 25 and the end thereof brought back on itself and a swagging collar 57 fitted thereover as shown in FIG. 3 to secure such cable in position looped around the thimble 21.

Figure 4:
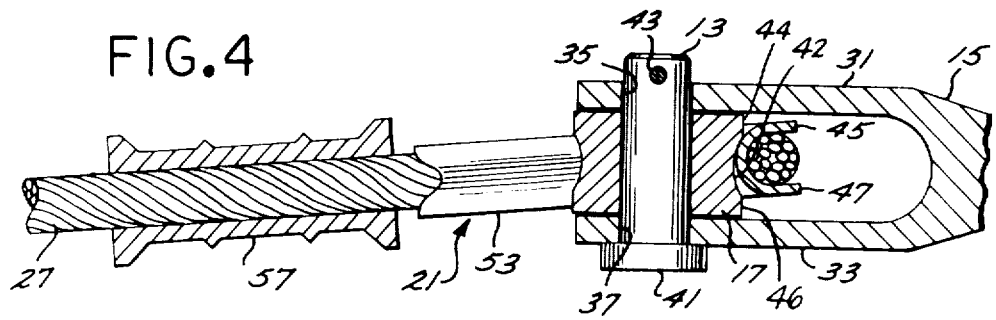
FIG. 4 is a longitudinal sectional view similar to FIG. 2.

When forces are then applied to the cable 27, the enlarged end 23 of the thimble 21 will cause the cable to maintain the relatively large curvature defined thereby and prevent formation of a sharp bend therein. Further, the cable 27 is supported against flattening by the side walls 45 and 47. It will be appreciated that the groove 42 in the bushing 17 serves to maintain the thimble 21 centered on such bushing to provide for uniform distribution of stresses on the mounting pin 13 and to also tend to prevent the cable 27 from contacting the tines 31 and 33 to reduce wear as a result thereof. Additionally, when side forces are applied to the cable 27 to cause it to assume an off-axis position as shown in FIG. 4, the legs 51 and 53 of the thimble 21 will provide protection for the cable 27 to prevent engagement thereof with the tines 31 and 33 or adjacent equipment to thereby prevent wear and breaking of cable strands and the like.

It will be noted that the bushing 17 is of sufficient width to substantially occupy the space between the tines 31 and 33 to thereby prevent application of bending moments to the mounting pin 13 due to forces applied on the cable 27, it being appreciated that such forces result in sheer stresses on the pin 13 rather than bending stresses.

From the foregoing it will be apparent that the cable connector of present invention provides an economical and convenient means for connecting a cable to a fitting and for preventing undue stresses due to sharp bending of a cable and for preventing flattening of the cable when stresses are applied thereto. Further, the loop portion of the cable is protected from engagement with the side of the fitting when side loads are applied thereto to eliminate undue wear and breaking of the cable strands as a consequence thereof.

Various modifications and changes may be made with regard to the foregoing detailed description without departing from the spirit of the invention.

I claim:

1. An articulated cable connector for connecting a cable to an elongated bifurcated fitting to carry a heavy load, said fitting forming a fork defining a pair of tines spaced apart at a selected distance and having apertures removably mounting a relatively small cross section transversely extending mounting pin, said connector comprising:

a substantially annular bushing formed with a through axial passage of a predetermined cross section for receipt of said pin and further formed with a relatively large longitudinal cross section defining a peripheral groove having an arcuate peripheral load-carrying surface with a predetermined radius of curvature;

an elongated thin walled thimble formed in its central portion with an enlarged arcuate bite portion complimentally received over said load-carrying surface of said bushing and angling inwardly on its opposite extremities to form inwardly angled legs, said bite portion being formed substantially C-shaped in cross section with a radius of curvature that is substantially smaller than said predetermined radius of curvature so as to facilitate lateral tilting of said thimble with respect to said bushing, said thimble being turned outwardly on its opposite transverse edges to form an outwardly facing cable-receiving trough and having a transverse width substantially narrower than said selected distance to allow such transverse tilting whereby said pin may be removed from said tines, said bushing and thimble fitted between said tines and said pin inserted through said passage to mount said bushing from said tines and a cable wrapped about said thimble and when a heavy load is applied thereto said cable will seat in said trough to be supported on said load-carrying surface to avoid any excessively sharp bends in said cable and the consequent excessive stresses in said cable while said bushing cooperates with said tines to apply substantially only sheer stresses to said pin while allowing for articulation of said thimble with respect to said bushing.

2. An articulated cable connector as set forth in claim 8 wherein:

said bushing is formed with a peripheral groove defining said load-carrying surface and terminating with retaining ribs disposed on opposite sides of said groove and having a longitudinal cross section with at least one dimension being larger than the corresponding interior longitudinal dimension of said thimble to retain said thimble on said bushing without assistance of said tines.

3. An articulated cable connector as set forth in claim 1 wherein:

said bushing is circular in longitudinal cross section.

4. An articulated cable connector as set forth in claim 1 wherein:

said legs project beyond the ends of said tines to protect said cable from said tines.

5. An articulated cable connector as set forth in claim 2 wherein:

said bushing is circular in longitudinal cross section.

6. An articulated cable connector as set forth in claim 2 wherein:

said legs project beyond the ends of said tines to protect said cable from said tines.

References Cited

UNITED STATES PATENTS

| 1,823,261 | 9/1931 | Elliott et al. | 287—81 |
| 2,476,731 | 7/1949 | Hobbs, Jr. | 287—78 |
| 3,018,319 | 1/1962 | Quayle | 287—81 X |
| 2,110,407 | 3/1938 | Tallmon | 24—123 G |
| 3,527,487 | 9/1970 | Payne | 287—81 X |

FOREIGN PATENTS

| 622,527 | 6/1961 | Canada | 174—79 |

ANDREW KUNDRAT, Primary Examiner

U.S. Cl. X.R.

24—115